US009667686B2

(12) United States Patent
Ramalho et al.

(10) Patent No.: US 9,667,686 B2
(45) Date of Patent: *May 30, 2017

(54) SYSTEM AND METHOD FOR IMPROVING AUDIO QUALITY DURING WEB CONFERENCES OVER LOW-SPEED NETWORK CONNECTIONS

(71) Applicant: Cisco Technology, Inc., San Jose, CA (US)

(72) Inventors: Michael A. Ramalho, Lakewood Ranch, FL (US); Mihailo Zilovic, Lawrenceville, NJ (US); Laurent Kim-Huy Pham, Milpitas, CA (US); Gary A. Skrabutenas, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 181 days.

This patent is subject to a terminal disclaimer.

(21) Appl. No.: 14/576,855

(22) Filed: Dec. 19, 2014

(65) Prior Publication Data

US 2015/0172355 A1 Jun. 18, 2015

Related U.S. Application Data

(63) Continuation of application No. 13/555,371, filed on Jul. 23, 2012, now Pat. No. 8,948,058.

(51) Int. Cl.
*H04L 29/06* (2006.01)
*H04L 12/18* (2006.01)

(52) U.S. Cl.
CPC .......... *H04L 65/80* (2013.01); *H04L 12/1818* (2013.01); *H04L 65/403* (2013.01)

(58) Field of Classification Search
CPC .... H04L 12/2697; H04L 43/50; H04L 69/329
See application file for complete search history.

(56) References Cited

U.S. PATENT DOCUMENTS 7,944,844 B2 * 5/2011 Ee ...................... H04L 12/2697
370/248
8,593,985 B2 11/2013 Oue et al.

* cited by examiner

*Primary Examiner* — Chandrahas Patel
(74) *Attorney, Agent, or Firm* — Parker Ibrahim & Berg LLC; James M. Behmke; Stephen D. LeBarron

(57) ABSTRACT

A method that includes: (1) transmitting, at a first transmit time point, a first probe packet over a network connection to a conferencing server immediately before transmitting a data packet, the first probe packet arriving at the conferencing server at a first receive time point; (2) transmitting, at a second transmit time point, a second probe packet over the network connection to the conferencing server immediately after transmitting the data packet, the second probe packet arriving at the conferencing server at a second receive time point, the first and second probe packets being smaller than the data packet; (3) receiving information encoding a first difference between the first and second transmit time points and a second difference between the first and second receive time points; and (4) based on the first and second differences, modifying a transmission parameter associated with data packets to be transmitted thereafter to the conferencing server.

17 Claims, 6 Drawing Sheets

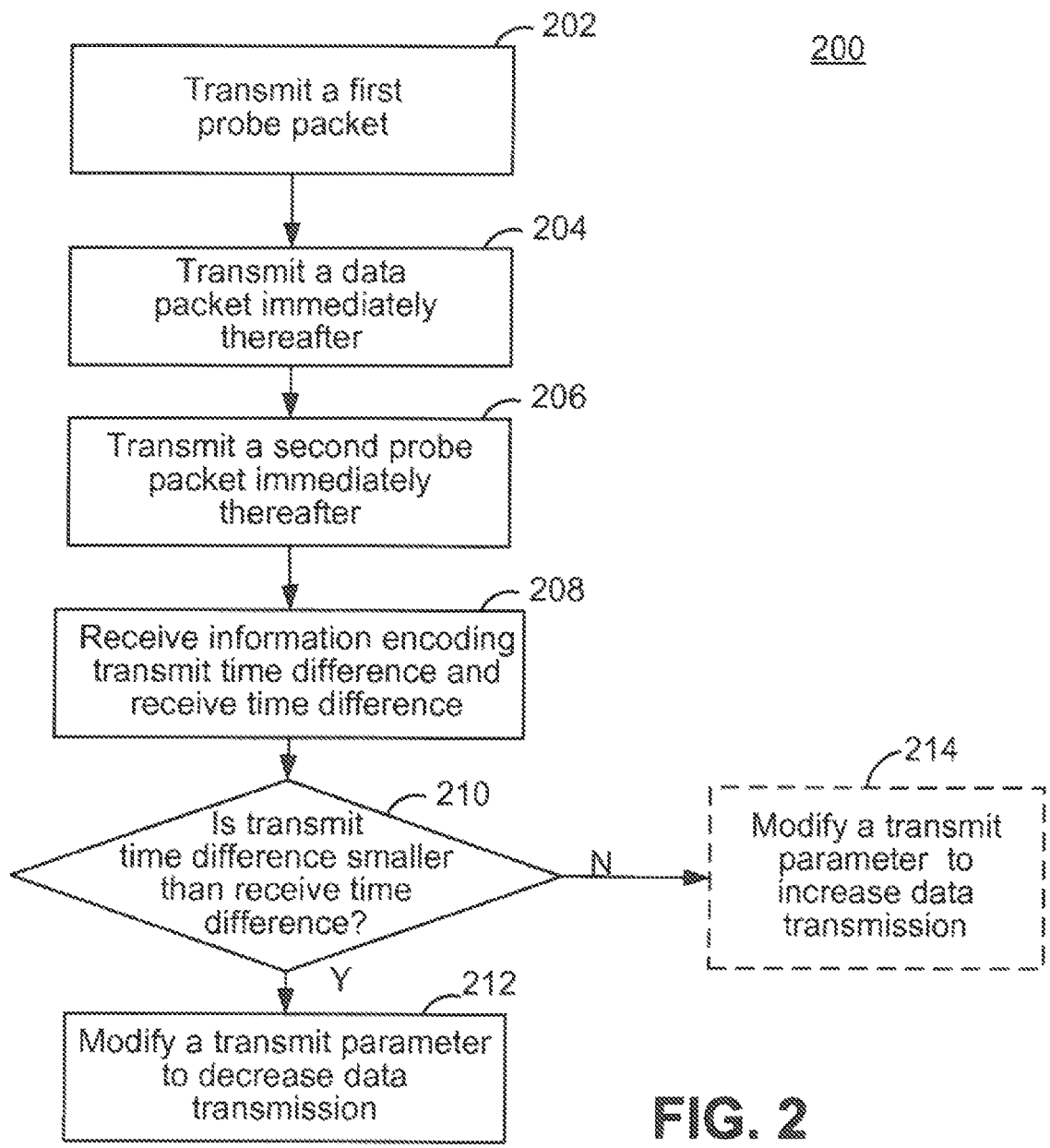

SYSTEM AND METHOD FOR IMPROVING AUDIO QUALITY DURING WEB CONFERENCES OVER LOW-SPEED NETWORK CONNECTIONS

CLAIM FOR PRIORITY

This application is a Continuation Application of U.S. patent application Ser. No. 13/555,371, filed Jul. 23, 2012, the entire contents of which is incorporated herein by reference in its entirety.

TECHNICAL FIELD

The following disclosure relates generally to software web-conferencing.

BACKGROUND

Software web-conferencing allows people to collaborate remotely using a computer and over a broadband internet connection. However, the audio experience of a web-conferencing application may be unsatisfactory for a remote user participating the web conference over a low-speed internet connection.

BRIEF DESCRIPTION OF THE FIGURES

FIG. 2 shows a flow chart of a method for improving audio quality of web-conferencing over one network connection shared by more than one data streams.

DETAILED DESCRIPTIONS OF EXAMPLE EMBODIMENTS

Overview

An implementation provides a method for managing a web-conferencing application. The method includes: (1) transmitting, at a first transmit time point, a first probe packet over a network connection to a conferencing server immediately before transmitting a data packet, the first probe packet arriving at the conferencing server at a first receive time point; (2) transmitting, at a second transmit time point, a second probe packet over the network connection to the conferencing server immediately after transmitting the data packet, the second probe packet arriving at the conferencing server at a second receive time point, the first and second probe packets being smaller than the data packet; (3) receiving information encoding a first difference between the first and second transmit time points and a second difference between the first and second receive time points; and (4) based on the first and second differences, modifying a transmission parameter associated with data packets to be transmitted thereafter to the conferencing server.

DETAILED DESCRIPTION

When both the VoIP audio and web conference datashare streams share the same low-speed internet connection, contention for network bandwidth can ensue. Datashare streams may include, for example, video, email, instant message, internet, relay chat, on-line text, etc. The contention for bandwidth between audio and datashare streams can result in poor conference audio quality (for example, silence, gaps, distortion, excessive speech latencies or unintelligible speech, etc.). To measure the contention, a participant presenting in a web-conference may introduce a probe packet immediately before one large datashare packet. The participant also may introduce another probe packet immediately alter the datashare packet. The probe packets each have a time-stamp, indicating the respective transmit time from the participant. When the probe packets arrive at the web-conferencing server, the web-conferencing server records the respective receive times. Thereafter, the web-conferencing server calculates the difference in the transmit times of the two probe packets. The web-conferencing server also calculates the difference in the receive times of the two probe packets. If the difference in the transmit times is smaller than the difference in the receive times, the increased latency of the second probe packet relative to the first is representative of the increased delay for the audio component of the same web-conference. Since the audio and datashare components share the same network connection, a burst of traffic in the datashare component can lead to quality degradation in the audio component. To mitigate the quality degradation, the participant, may slow down subsequent data transmission of the datashare component, in response to the increased latency. Therefore, quality of service of the audio component may be enhanced through adjustment of the datashare component of the same web-conferencing application.

Figure 1:
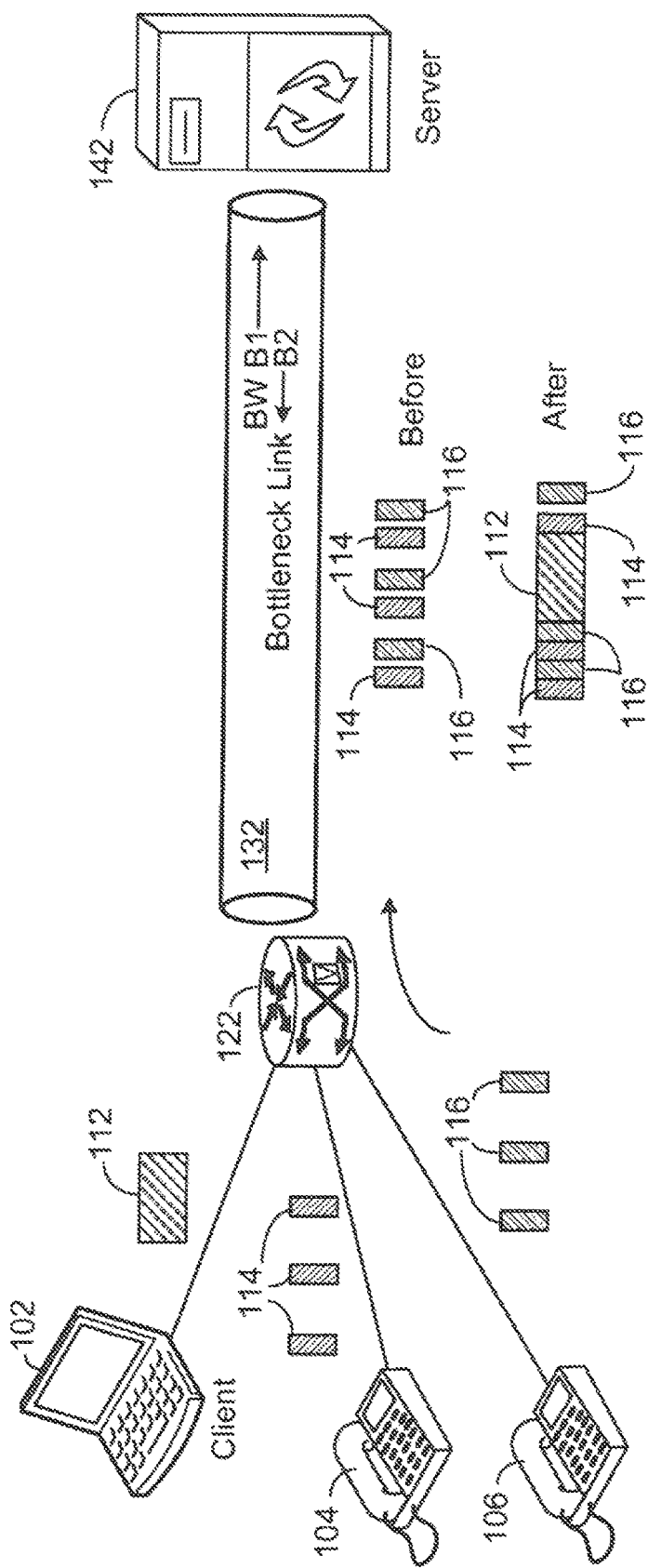
FIG. 1 illustrates an example web conference.

FIG. 1 illustrates an example web conference. The web conference may be conducted through a software application, for example, a WebEx application. As shown in FIG. 1, clients 102, 104, and 106 can participate, through server 142, in a web conference. For example, clients 104 and 106 may be Internet Protocol (IP) phones supported by Voice-over-IP (VoIP) technologies. Client 104 may transmit IP packets 114 during the web conference. The packets may arrive at networking device 122. Likewise, client 106 may transmit IP packets 116 during the same web conference and IP packets 116 may arrive at networking device 122. Networking device 122 may be, for example, a digital subscriber line (DSL) modem, a cable modem, a router, a switch, etc. Networking device 122 may forward IP packets 114 and 116 through connection link 132 to server 142.

Connection link 132 may be, for example, a residential broadband DSL connection or a cable connection. Connection, link 132 may have a bottleneck link bandwidth of B1 and B2. Connection link 132 may have one bottleneck bandwidth B1 for the uplink (e.g., for end users to upload files) and another bottleneck bandwidth B2 for the downlink (e.g., for end users to download flies). The bottleneck bandwidth B1 associated with the uplink may be lower than the bottleneck bandwidth B2 associated with the downlink. Residential DSL connections may have a bottleneck bandwidth B1 of 128 Kbps for end users to upload data to a given server on the internet. For example, residential DSL connections may have a bottleneck bandwidth B2 of 1.5 Mbps for end users to download data from a given server on the internet. Generally, the bottleneck link bandwidth B1 and B2 associated with, residential broadband DSL or cable connections may be relatively low, compared to connections on an enterprise network or a campus network.

A web-conferencing communication between server 142 and clients 102, 104, and 106 may use two logic connections: one for audio and the other for the web conference datashare. Both logic connections may be created by the client and server applications as separate sockets. The audio connection may typically use User Datagram Protocol (UDP) for low-latency but may fall back to Transmission Controlled Protocol (TCP) if UDP is blocked by a firewall. The web conference datashare connection may use Hyper Text Transfer Protocol Secure (HTTPS) over TCP/SSL/TLS. Example web conference datashare connections may transport data encoding, for example, images, email, instant message, internet relay chat, on-line text, etc.

When clients 104 and 106 share the connection link 132 during the web conference, the connection link 132 generally can provide enough bandwidth to offer audio sessions with sufficient quality. For example, a constant bitrate of approximately 50 Kbps may be enough for a VoIP audio stream with three multiplexed active speaker audio streams. As illustrated by the "Before" label, IP packets 114 and 116 are delivered regularly and on time over connection link 132 to server 142.

When client 102 joins with the web conference and adds the datashare presentation during the web conference, contention for bandwidth at connection link may ensue. Client 102 may be a computing device, for example, a laptop computer, a desktop computer, or a mobile computing device. Client 102 may transmit web conference datashare packet 112 which may arrive at networking device 122. While depicted in FIG. 1 as one datashare packet, packet 112 may include one or more maximum transmission unit (MTU) sized packets in practice. Thus, web conference datashare packet 112 may be substantially larger than audio packets 114 and 116 in size. For example, web conference datashare packet 112 may be over ten times as large as the audio packets 114 and 116. For example, web conference datashare packet 112 may be a "datashare burst" and may be implemented as a cluster of packets in a network. As an illustration, a "datashare burst" may have 4600 bytes and, after fragmentation, may correspond to four packets, three packets at 1500 bytes (the MTU size) and one packet at 100 bytes. Although the fourth packet (at 100 bytes) in this illustrative datashare packet burst may be similar to or even smaller than, for example, an individual audio packet in size, the "datashare bust," as a whole, tend to be larger than the corresponding audio packet burst, or real-time media burst, in size.

When networking device 122 forwards web conference datashare packet 112 over the connection link 132, bursts of web conference datashare packets 112 may be introduced onto connection link 132, for example, due to web share screen updates. The bursts of web conference dams-hare packets may interrupt the regular, real-time delivery of audio packets and thus will often, cause audio quality issues. For example, a screen refresh can lead to a transfer of about 60 Kb data encoded on the datashare packets (the amount of data per refresh depends upon the computer screen size). A large change in the presenter's screen client may cause a burst of up to five transfers per second (corresponding to a data rate in the range of from about 300 Kbps to about 1 Mbps). Thus, the combined audio and datashare packets being transmitted may reach a peak data rate in a range from about 350 Kbps to over 1 Mbps.

This burst of data may exceed the available bandwidth of a low-speed network connection and congestion, can occur. Low-speed connections such as 1.5 Mbps download/128 Kbps upload for DSL and 4-6 Mbps down load/1-1.5 Mbps upload for cable may be common for residential service. An increase in serialization delay may be an indicator that the available bandwidth can no longer support the transfer rate. In the presence of network connection congestion between client and server, excessive serialization delay for audio packets can occur even, if audio packets may have a higher priority than datashare packets.

As illustrated in FIG. 1 by the "After" label, web conference datashare packet 112 causes delay of subsequent audio data packets 114 and 116. Excessive serialization delay for audio packets may result in poor audio quality, including, for example, silence gaps, distorted speech, excessive latency, or in extreme congestion conditions, unintelligible speech. Other indications of network congestion include excessive jitter and packet loss. However, measurements of these impairments may not consider a direct relationship between the level of congestion and currently available bandwidth. Thus, these measurements are less likely than the serialization delay parameter to serve as a metric for achieving a graduated control of data transfer throughput over connection link 132.

Bandwidth reservation methods such as RSVP may not be relevant or useful for Internet based web-conferencing software applications. The RSVP protocol may need core routers capable of reserving and releasing bandwidth for a large number of conferencing streams. Such routers may only be practically available for a managed network. For the unmanaged Internet, a RSVP solution may not be relevant or useful.

Techniques based on a differentiated services ("diffserv") model may mark certain packets with higher priority than other packets. By using the differentiated services code point (DSCP) field in the IP header, audio data packets can be marked with higher priority over data packets. Routers and switches in a managed network may respond to these marked packets and provide performance tailored to the packet markings. But, the same cannot be said for routers and switches on a unmanaged network. Because, software-as-service (SaaS) based web-conferencing systems may operate over unmanaged networks such as the internet, packet marking techniques may be inapplicable.

Rate-limiting (or "congestion control") capabilities may be provided by, for example, TCP (RFC-3550). Once a network congestion has been detected in the network, the window size of the data segment (from the sender to the receiver) can be reduced. However, TCP congestion control protocols may not allow the web-conferencing software application to control serialization delay by controlling the amount of source data delivered to a TCP socket.

FIG. 2 shows a flow chart 200 of a method for improving audio quality of web conference over one network connection shared by more than, one data streams. In block 202, a web-conferencing application loaded on, for example, client 102 of FIG. 1, transmits a first probe packet. The client 102 can be a computing device as will be discussed in association with FIG. 3A and FIG. 3B. Immediately thereafter, as shown in block 204, the web-conferencing application loaded on client 102 transmits a data packet. The data packet may be, for example, web conference datashare packet 112 as shown in FIG. 1.

As illustrated, in FIG. 2, the first probe packet is transmitted by the web-conferencing application immediately before the data packet is transmitted by the same web-conferencing application. In one configuration, no intervening packets can be transmitted by the web-conferencing application between the first probe packet and the data packet. In another configuration, the web-conferencing application places the first probe packet and the data packet in a queue of packets for network device 122 of FIG. 1 to transmit. For example, the web-conferencing application can place the first probe packet immediately before the data packet in the queue. Thereafter, network device 122 transmits the queue of packets in a first-in-first-out manner. In yet another configuration, the web-conferencing application places the first probe packet immediately before the data packet in a queue of packets for transmission by a network interface on the client computer. In still another configuration, the transmission of the queue follows a monotonic transmission rate. In yet still another configuration, the transmission rate can vary according to a collision control mechanism in the underlying Media Access Control (MAC) layer.

As shown in block 206, immediately after the data packet is transmitted, the web-conferencing application loaded on client 102 transmits a second probe packet. As discussed above, in one configuration, no intervening packets can be transmitted by the web-conferencing application between the data packet and the second probe packet. In another configuration, the web-conferencing application places the data packet and the second probe packet in the queue of packets for transmission by network device 122 of FIG. 1. For example, the web-conferencing application can place the second probe packet immediately after the data packet in the queue and the transmission of the queue is on a first-in-first-out basis, in yet another configuration, the web-conferencing application places the second probe packet immediately after the data packet in a queue of packets for transmission by a network interface on the client computer. In still another configuration, the transmission follows a monotonic transmission rate. In yet still another configuration, the transmission rate may vary according to collision control mechanism in the underlying Media Access Control layer.

As discussed above, the first probe packet, the data packet, and the second probe packet are placed into a queue one after the other, with no intervening packets, and in the order of: the first probe packet, the data packet, and the second probe packet. Hence, a transmitter may easily schedule a sequential transmission of the first probe packet, the data packet, and the second probe packet. For example, the network interface on the client computer running the web-conferencing application can schedule the sequential transmission of the queue.

The probe packets from block 202 and 206 are substantially smaller than that of the data packet from block 204 in size. For example, the probe packets could be smaller than a maximum transmission unit (MTU) specified for connection link 132 of FIG. 1 (e.g., an IPv4 path MTU of 68 bytes). For example, the probe packets may have their Don't Fragment (DP) bit turned on. For example, the probe packets are less than one tenth the size of the data packet. In general, the probe packets are small and benign packets for measuring a serialization delay. In one configuration, the probe packets are based on Internet Control. Messaging Protocol (ICMP). In another configuration, the probe packets are dummy packets with no pay load data.

The probe packets include timestamps indicating the transmit time of the packet. For example, the transmit time can be the time at which the probe packet was transmitted by web-conferencing client 102 of FIG. 1. In one configuration, the timestamp information is from a Network Time Protocol (NTP). In one configuration, the timestamp information is from a local clock of the web-conferencing client 102.

In block 208, the web-conferencing application receives information encoding a difference between the transmit time of the first probe packet and the transmit time of the second probe packet as well as the receive time difference. The difference between the transmit time of the first probe packet and the transmit time of the second probe packet can be computed based on the respective timestamps of the first and second probe packets. In one configuration, server 142 of FIG. 1 performs this transmit time difference computation.

In one configuration, server 142 computes the receive time difference. In this configuration, the receive time difference denotes the difference between the receive time of the first probe packet at server 142 and the receive time of the second probe packet at server 142. The receive time of a packet can be, for example, represented by the time when the packet has been picked up by the network interface of server 142 and processed by server 142. In one example, the receive time is according to a Network Time Protocol (NTP). In another example, the receive time is according to a local clock on server 142.

In one configuration, the information encoding the transmit time difference and receive time difference is included in a return packet from server 142 to client 102. In this configuration, the information encoding the transmit time difference and the receive time difference is in the pay load of the return packet. The transmit time difference and receive time difference may be encoded, for example, in ASCII format or binary format. In one example, the return packet can be a packet based on the ICMP protocol. In another example, the return packet may be based on the second probe packet. The return packet can be picked up by the network interface of client 102 and the information encoding the time differences may then become available to client 102.

At block 210, the web-conferencing application compares the transmit time difference and the receive time difference. For example, the comparison may be a binary comparison. In one configuration, the comparison incorporates a threshold difference such that the transmit time difference is determined smaller than the receive time difference when the transmit time difference is smaller by more than the threshold difference. In this configuration, when the transmit time difference is not smaller by more than the threshold difference, the transmit time difference is determined as not smaller than the receive time difference. In this configuration, the threshold difference provides a margin to mitigate spiky measurement noise. For example, the threshold difference can be pre-determined and dependent on measurement noise in the network.

In block 212, if the transmit time difference is determined as smaller than the receive time difference, the web-conferencing application, for example, on client 102 may reduce data transmission thereafter. In one configuration, the data transmission includes transmission of subsequent web conference datashare packets 112. In this configuration, the reduction of data transmission can include a reduction in the size of subsequently transmitted datashare packets 112. The reduction of data transmission also may include a reduction in the number of subsequently transmitted web conference datashare packets 112 per unit time, for example, per second. The reduction of data transmission further may include a reduction in the amount of data, for example, in number of total data bytes, transmitted by subsequent web conference datashare packets 112. In this configuration, the reduction in data transmission by client 102 serve an "altruistic" purpose so that serialization delays, as discussed above in association with FIG. 1 and inflicted on audio data packets 114 and 116, can be mitigated by a reduction in datashare transmission. According to this configuration, the mitigation is achieved at the application level, without involving a managed network.

Packet pacing to lower data transmit rate in the presence of connection bottlenecks may have been used to improve transmission of mobile and web conference datashare data. However, these implementations apply packet pacing only to improve quality of the data flow itself for example, the web conference datashare packets 112. The packet pacing used by various implementations disclosed herein is applied to a data flow (for example, web conference datashare packets 112) for the benefit of a different flow (for example, audio data packets 114 and 116).

In block 214, if the transmit time difference is not determined as smaller than the receive time difference, the web-conferencing application, for example, on client 102 may increase data transmission thereafter. The data transmission may include transmissions of for example, more subsequent web conference datashare packets 112. In one configuration, the increase in data transmission includes an increase in the size of subsequently transmitted web conference datashare packets 112. In another configuration, the increase in data transmission includes an increase in the number of subsequently transmitted web conference datashare packets 112 per unit time, for example, per second. In yet another configuration, the increase in data transmission includes an increase in the amount of data, for example, in number of total data bytes, transmitted by subsequent web conference datashare packets 112. In the above configurations, the increase in data transmission cm improve utilization of available bandwidth in, for example, connection link 132.

Figure 3A:
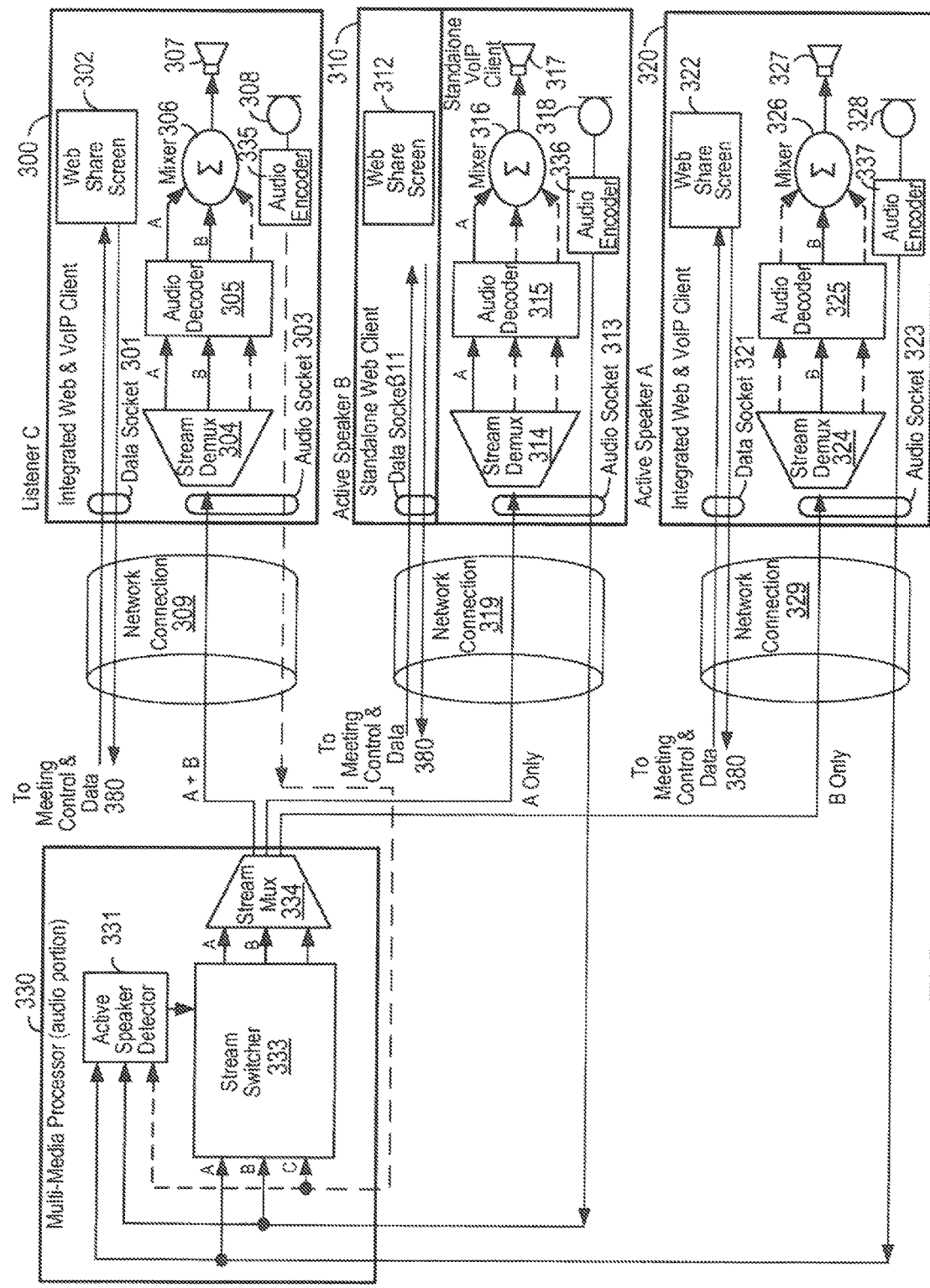
FIG. 3A illustrates an example system implementation for a web-conferencing application.

FIG. 3A illustrate an example system implementation for a web conferencing application. Listener C 300, Active Speaker B 310, and Active Speaker A 320 remotely participate in a web conference through network connections 309, 319, and 329 respectively. As illustrated in FIG. 3A, server 330 manages the audio portion of the web conference using a multi-media processor (MMP). The MMP performs active speaker detection and stream selection. The example implementation illustrated in FIG. 3A employs a distributed conference architecture, as discussed below.

In the example implementation, the MMP receive audio data streams from active speaker A 320 and active speaker B 310. The MMP does not receive audio data stream from listener C 300. Active speaker detector 331 determines the loudest speaker of the two current active speakers and turns on stream switcher 333 to pass the encoded audio data stream of the two current active speakers. Stream Mux 334 then multiplexes the encoded audio data streams into individual audio data streams appropriate for listener C 300, active speaker B 310, and active speaker A 320. Thereafter, the appropriate multiplexed data stream is transmitted by server 330 to the three participants—listener C 300, active speaker B 310, and active speaker A 320.

When the data stream arrives, through network connection 309 at listener C 300, the packets of the audio data stream first reach audio socket 303. Then, stream Demux 304 de-multiplexes the data stream to generate the corresponding audio data streams for active speaker B 310, and active speaker A 320. Thereafter, audio decoder 305 decodes the corresponding data streams. Subsequently, mixer 306 blends two decoded data streams to feed loudspeaker device 307. As shown in FIG. 3A, listener C 300 also includes a microphone device 308 to convert Listener C's voice into audio data, encoded into compressed digital, format by audio encoder 335, and transmitted through audio socket 303 to network connection 309 and then to server 330. However, because Listener C is not speaking or muted, no audio data is transmitted from this source to the audio socket 303. Listener C 300 also has a data socket 301 as an interface to transmit and receive the web conference datashare stream corresponding to the datashare portion of the web conference. The datashare portion of the web conference is displayed on web share screen 302. The audio data stream exchanged between server 330 and listener 300 and the datashare stream exchanged between server 380 and listener 300 for the web conference both share the same network connection 309.

Active speakers B 310 and A 320 may have corresponding components that are similar to those of Listener C 300, as discussed, above. For example, Active speakers B 310 and A 320 may have data sockets (311 and 321 respectively), web share screens (312 and 322 respectively), audio sockets (313 and 323 respectively), stream demux's (314 and 324 respectively), audio decoders (315 and 325 respectively), mixers (316 and 326 respectively), loudspeaker devices (317 and 327 respectively), audio encoders (336 and 337 respectively), and microphone devices (318 and 328 respectively). The audio and web conference datashare streams exchanged between server 330 and server 380 and each active speaker for the web conference may share a common network connection (319 and 329 respectively).

Figure 3B:
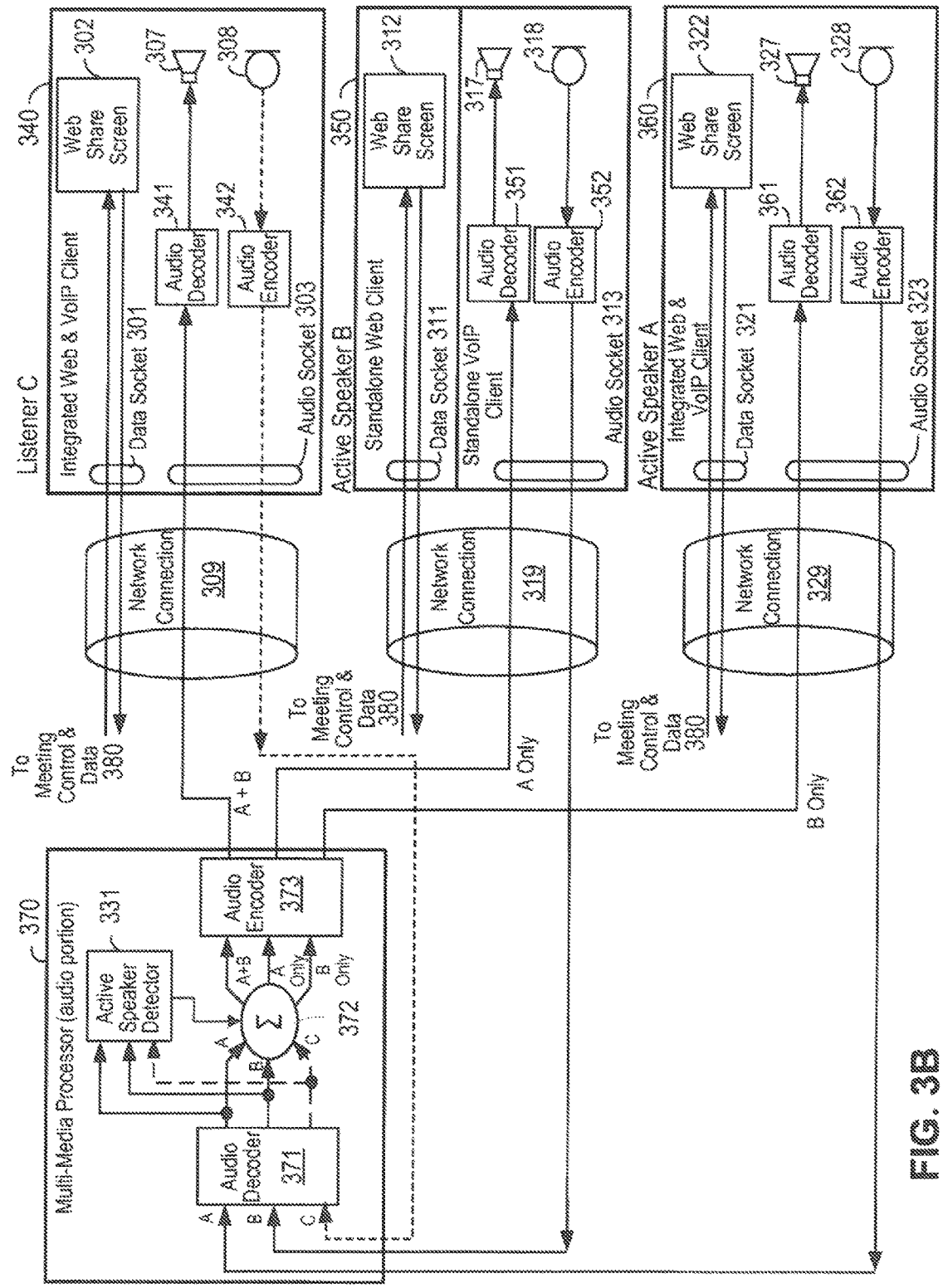
FIG. 3B illustrates another example system, implementation for a web-conferencing application.

FIG. 3B illustrates another example system implementation for a web conferencing application. Listener C 340, Active Speaker B 350, and Active Speaker A 360 remotely participate in a web conference through network connections 309, 319, and 329 respectively. In this example implementation, server 330 manages the audio portion of the web conference using a multi-media processor (MMP) and according to a centralized conference architecture, as discussed below.

The MMP receives audio data streams from active speaker A 360 and active speaker B 350. The MMP does not receive audio data stream from listener C 340. Audio decoder 371 may process the two active speaker audio data streams. Active speaker detector 331 may determine the loudest speaker of the two current active speakers based on the decoded data streams. The MMP then performs server side audio mixing at mixer 372. Mixed audio data streams are transmitted to participants after an encoding operation by audio encoder 373. The mixed audio data streams include, for example, streams of partial mixes to active speakers B 350 and A 360 as well as a stream of the mix of all active speakers to listener C 340.

In this centralized conference architecture, the client applications simply decode the received audio data streams. When the data stream arrives, through network connection 309 at listener C 340, the packets of the audio data stream first reach audio socket 303. Audio decoder 341 then decodes the received audio data stream and then channel the audio data stream to loudspeaker device 307. In the reverse direction, microphone device 308 and encoder 342 can encode the listener C's audio into an audio data stream and send the audio data stream through audio socket 303 to network connection 309 and then to server 370. However, because Listener C 340 is not speaking or muted, no audio data is transmitted to the audio socket 303. Listener C 340 also has a data socket 301 as an interface to transmit and receive web conference datashare stream corresponding to the web conference. The datashare portion of the web conference is displayed on web share screen 302. The audio data stream, exchanged between server 370 and listener 340 and the datashare stream exchanged between server 380 and listener 340 for the web conference both share the network connection 309.

Active speakers A 360 and B 350 may have corresponding components that are similar to those of Listener C 340, as discussed above. For example, active speakers B 350 and A 360 may have data sockets (311 and 321 respectively), web share screens (312 and 322 respectively), audio sockets (313 and 323 respectively), audio decoders (351 and 361 respectively), audio encoders (352 and 362 respectively), loudspeaker devices (317 and 327 respectively), and microphone devices (318 and 328 respectively). The audio and web conference datashare streams exchanged between server 370 and server 380, respectively, and each active speaker share a common network connection (319 and 329 respectively).

For FIG. 3A and FIG. 3B, the participants of the web conference can be an integrated web and VoIP client (for example, listener C 300 and 340, active speaker A 320 and 360). Participants of the web conference also can be a stand-alone web client and a stand-alone VoIP client (for example, active speaker B). In either case, the audio and web conference datashare streams exchanged between one participant and the servers share a common network connection.

Figure 4:
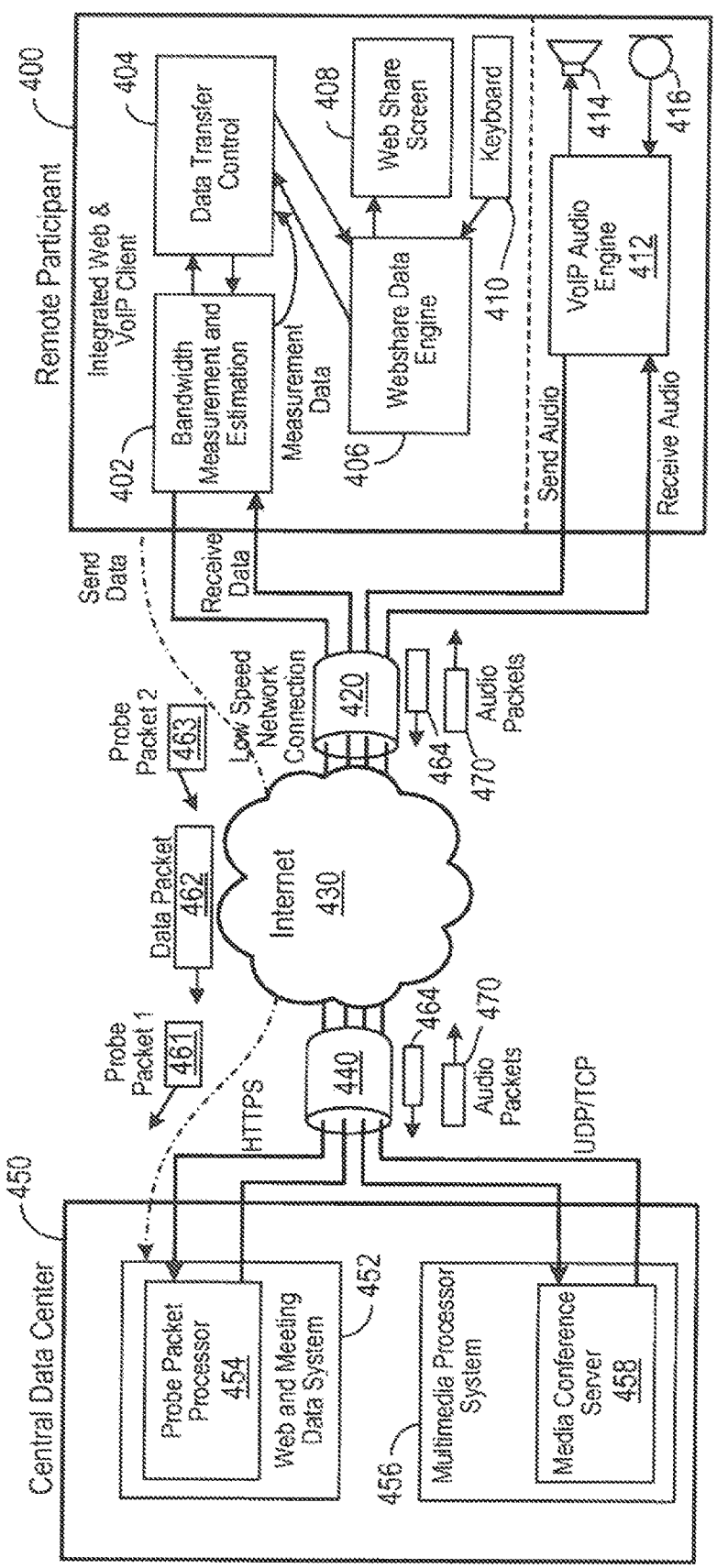
FIG. 4 illustrates a packet flow over a low-speed network connection according to a system implementation.

FIG. 4 illustrates a packet flow over a low-speed network connection according to one system implementation. A remote participant 400 joins a web conference hosted at central data center 450 through internet 430. A low-speed network connection 420 bridges the remote participant 400 to internet 430. The central data center (CDC) 450 is connected to internet 430 through network connection 440. As discussed above in associations with FIGS. 1, 3A and 3B, audio data packets 464 and 470 as well as web conference datashare packet 462 are exchanged between remote participant 400 and central data center (CDC) 450, while the audio data packets 470 can be channeled to the loudspeaker 414. The low-speed network connection 420 has a bottleneck bandwidth B. As discussed in association with FIG. 1, serialization delay of audio packets can occur when a burst of datashare packets 462 are introduced into low-speed network connection 420. The remote participant 400 generates the burst of datashare packets to accommodate an update of web share screen (e.g. screens 302, 312, or 322 of FIG. 3A and FIG. 3B). When serialization delay occurs, audio quality of the web conference can be seriously impaired, as discussed above in association with FIG. 1.

To measure serialization delay, bandwidth measurement and estimation (BME) block 402 may use probe packets in the manner as described above in association with FIG. 2. For example, BME block 402 may transmit probe packets 461 and 463 to CDC 450, respectively, immediately before and immediately after transmitting a data packet 462. As discussed above in association with FIG. 2, no intervening packets from remote participant 400 can be placed between the concatenation of packets 461, 462, and 463. The subsequent transmission of the three queued packets by remote participant 400 incurs no additional transmission delay because there are no in-between packets.

CDC 450 includes web and meeting data system (WMDS) 452. WMDS 452 includes probe packet processor (PPP) 454 for processing the received packets 461, 462, and 463. As indicated by FIG. 4, packets 461, 462, and 463 can follow, for example, a HTTPS protocol. CDC 450 also may include multimedia processor (MMP) system 456 for processing audio packets 464 and 470 associated with the web conference, and the MMP system 456 may include a media conference server 458. As indicated by FIG. 4, audio packets 464 and 470 may use, for example, a UDP or TCP protocol.

To avoid measurement inaccuracies, UDP transport can be used for probe packets 461 and 463 instead of TCP to reduce queuing and buffering delays possible with the latter. Also, each probe packet may include a timestamp reflecting as close as possible the actual send time of the probe packet into the network connection 420.

PPP 454 calculates two values based upon timestamps in packets 461 and 463: (1) a difference between client send timestamps for the probe packets 461 and 463; and (2) a difference between server receive timestamps for the probe packets 461 and 463. As to (1), the client send timestamps of packets 461 and 463 correspond to the respective transmit time of the probe packet at remote participant 400. The transmit difference is denoted as "delta ts" and may be in seconds. The transmit difference represents the time spent to send data packet 462 at remote participant 400. As to (2), the server receive timestamps of packet 461 and 463 correspond to the respective receive time of the probe packet at WMDS 452. This receive difference is denoted as "delta tr" and may be in seconds. This receive difference represents the time spent receiving the burst of data packets 462 from the perspective of CDC 450. The receive difference includes contributions of additional delays incurred during the transportation over the entire uplink from the remote participant 400 to CDC 450. Assuming the rest of the network has reasonably broad bandwidth, the bottleneck is the low-speed network connection 420 (as commonly known as the last mile problem). Hence, a comparison between the receive difference and the transmit difference can reveal the status of low-speed network connection 420.

CDC 450 then reports "delta ts" and "delta tr" values back to the BME block 402 of remote participant 400. The information encoding values of "delta ts" and "delta tr" may be, for example, in the pay load of a return packet, or a SIP INFO message.

In one configuration, probe packet 461 and 463 each has "a correlation identifier." In addition, probe packet 463 includes information encoding the size of data packet 462 (for example, in bytes). The correlation identifiers and the size information of the data packet in-between the probe packets allow BME 402 to forgo keeping state information of previously sent packets. In this configuration, BME 402 can simply make the above calculations based on the information in the return packets.

In one configuration, the return packets for probe packets 461 and 463 arrive at BME 402 individually (for example, two separate replies for the two probe packets). In response, BME 402 performs a simple correlation to match the return packets to the respective probe packet. In this configuration, CDC 450 performs no such correlations to match packets. Therefore, CDC 450 simply timestamp, calculate "delta_tr" and "delta ts" and then send the information back to remote participant. In other words, CDC 450 only performs a "receive-timestamp-calculate-send-then-forget" operation in this configuration.

In one configuration, BME 402 combines the difference values with the size of data byte 462 to calculate data connection send bitrate and receive bitrate. For example, the size of the data packet 462 can be a known constant. For example, the size of the in-between data packet also can be encoded in the payload of the return packet for probe packet 463 (the second probe packet). The size of the data packet 462 is denoted as n bytes. The data packet 462 corresponds to a burst of consecutive packets transmitted by remote participant in response to a screen refresh. In this configuration, the BME 402 knows the current audio codec used by remote participant 400 (e.g., constant bitrate codecs such as iLBC or G.711) and calculates the total connection bitrate (or bandwidth) according to the following formulas:

$$\text{Total Send Bitrate} = n \text{ bytes} * (8 \text{ bits/byte})/(\text{delta } ts) + \text{Codec Bitrate} \quad (1)$$

$$\text{Total Receive Bitrate} = n \text{ bytes} * (8 \text{ bits/byte})/(\text{delta } tr) + \text{Codec Bitrate} \quad (2)$$

In case of a separate standalone conference and VoIP client, as illustrated by active speakers B 310 and 350 of FIG. 3A and FIG. 3B, a configuration file is consulted to determine the codec used and the bit rate of the codec. In this configuration, BME 402 then delivers "delta ts", "delta tr", and the calculated results from formulas (1) and (2) to the data transfer control (DTC) block 404.

In response, DTC block 404 compares the "delta ts" and "delta tr" values and then chooses a course of action for subsequent transmissions of data packets 462 from remote participant 400 to CDC 450. For example, if "delta ts" is smaller than "delta tr" by a pre-determined threshold margin, "delta ts" may be determined as smaller than "delta tr." The pre-determined threshold margin may mitigate the effect of network measurement noise. Once "delta ts" is determined as smaller than "delta tr," DTC block 404 decides that a contention condition, has occurred on network connection 420. As discussed above, the contention may manifest as the additional serialization delay encountered in transmitting probe packet 463 over network connection 420. In fact, data packet 462, introduced over the same network connection 420 immediately before probe packet 463, may have caused transmission traffic to exceed bottleneck bandwidth B of the network connection 420. As a result, DTC block 404 leads remote participant 400 to delay transmission of subsequent data packets 462. As illustrated by FIG. 4, DTC block 404 interacts with web data engine (WDE) 406 to reduce size of subsequent data packets 462 caused by a refresh of web share screen 408. The refresh could be triggered by a user motion on the keyboard 410. In one example, DTC block 404 interacts with web data engine (WDE) 406 to reduce the number of subsequent data packets 462 to be transmitted by remote participant 400 during a given period of time, for example, one second. In another example, DTC block 404 interacts with web data engine (WDE) 406 to reduce the aggregate amount of data, for example, the total data bytes of subsequent data packets 462 to be transmitted during a given period of time (such as, for example, one second).

If "delta ts" is not smaller than "delta tr" by the pre-determined threshold margin, then DTC block 404 may determine that a contention condition has not occurred on network connection 420. In other words, data packet 462, introduced over the same network connection 420 immediately before probe packet 463, may not have caused transmission traffic to exceed bottleneck bandwidth B of the network connection 420. Therefore, in this scenario, remote participant may simply take no action. Remote participant 400 further includes VoIP audio engine 412 to process, for the web conference application, voice data received from microphone device 416 and audio data stream received from CDC 450. The audio data stream can benefit from the above measurement of serialization delay and subsequent adjustment of the web conference datashare stream, as discussed.

Figure 5:
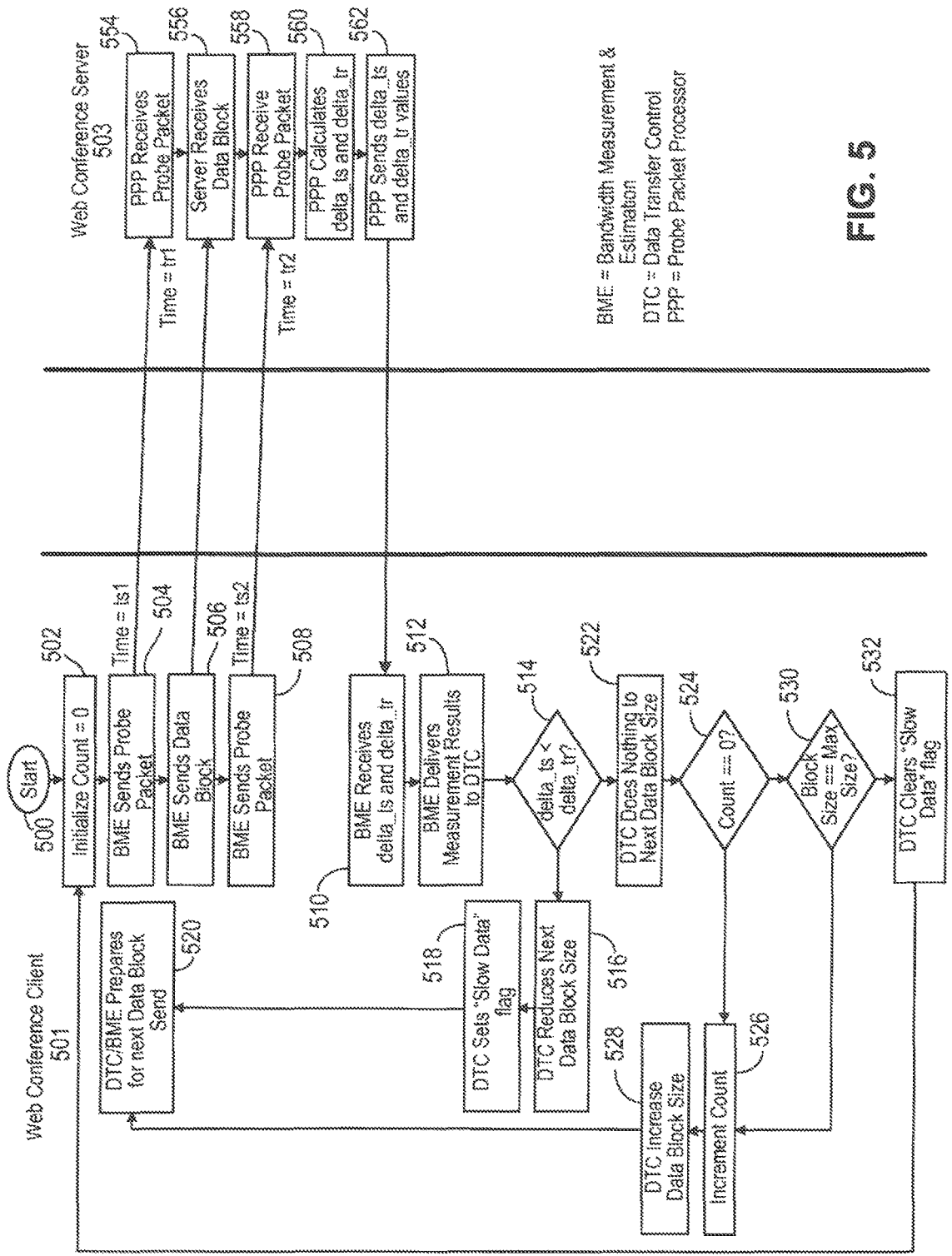
FIG. 5 illustrates packet exchanges between a web-conferencing client and a web-conferencing server according to an implementation.

FIG. 5 illustrates example packet exchanges according to an implementation. Web-conferencing client (WCC) 501 begins the process in block 500. In block 502, WCC 501 initializes a count as zero in value. In block 504, BME block 402 at WCC 501 transmits the first probe packet at time ts1. Thereafter, the first probe packet arrives at web-conferencing server (WCS) 503. In block 554, PPP 454 of WCS 503 receives the first probe packet at time tr1. In block 506, BME block 402 at WCC 501 transmits the data packet. Subsequently, the data packet arrives at WCS 503. In block 556, PPP 454 of WCS 503 receives the data packet. In block 508, BME block 402 at WCC 501 transmits the second probe packet at time ts2. Thereafter, the second probe packet arrives at WCS 503. In block 558, PPP 454 of WCS 503 receives the second probe packet at time tr2.

In block 560, PPP 454 of WCS 503 calculates the transmit time difference "delta ts" as the difference between ts1 and ts2. In block 560, PPP 454 of WCS 503 also calculates the receive time difference "delta tr" as the difference between tr1 and tr2. The basis for the time stamps have been discussed above in association with FIG. 2 and FIG. 4.

In block 562, PPP 454 of WCS 503 transmits information encoding values of "delta tr" and "delta ts" back to WCC 501. Example encoding methodologies have been discussed above in association with FIG. 2 and FIG. 4. As illustrated in FIG. 5, block 562 implements a "single, report back to the client" approach. However, Block 562 may use two separate return packets and a correlation identifier, as discussed above in association with FIG. 4.

In block 510, BME block 402 at WCC 501 receives information encoding values of "delta tr" and "delta ts." In block 512, BME block 402 delivers measurement results to DTC block 404, as discussed above in association with FIG. 4. In block 514, the DTC block 404 compares "delta tr" and "delta ts" to determine if "delta tr" is smaller than "delta ts," as discussed above in association with FIG. 4.

If "delta ts" is determined as smaller than "delta tr," the process then proceeds to block 516 in which DTC block 404 reduces block size of next data packet, as discussed above in association with FIG. 4. In block 518, DTC block 404 sets a flag of "Slow Data." The process then proceeds to block 520 in which the DTC block 404 and BME block 402 may prepare for transmission of the next data packets.

If "delta ts" is not determined as smaller than "delta tr," the process proceeds to block 522 in which DTC block 404 maintains the block size for the next data packet to be transmitted.

If the count value is zero, switch 524 directs the flow to block 526 to increment the count. Thereafter, the process proceeds to block 528 in which DTC block 404 increases the block size for subsequent data packets. Thereafter, the process proceeds to block 520 in which the DTC block 404 and BME block 402 may prepare for transmission of the next data packets.

If the count value is not zero, switch 524 directs the flow to block 530 to determine whether the block size is equal to a pre-defined maximum block size. If the block size is equal to the maximum block size, the process proceeds to block 526 to increment the count. If the block size is not equal to the maximum block size, the process proceeds to block 532 in which DTC block clears the "Slow Data" flag. Thereafter, the process proceeds to block 502 in which the count value is reinitialized to zero.

Therefore, VoIP audio quality during a web conference can be improved by providing a means for the conferencing client and/or server application to control the rate of simultaneous screen data transfers. The application software can delay or slow data transfers if contention is detected while leaving audio transfers unaffected. Data transfers may be delayed according to some implementations enough so that the combined audio and data bitrate is lowered to fit within available network connection bandwidth.

In another implementation, the data transfer control system and method described above is applied to a low-speed connection from server to client (e.g., home user downlink connection from the conference server to the conference client). In this implementation, the server issues probe packets to the client and the client can return information encoding the "delta ts" and "delta tr" values to the server.

In another implementation, the data transfer control system and method described above is applied to real-time media streams including not only audio but also video. Real-time media may refer to media presentation wherein media data is received at substantially the same rate that the audience/spectators experience them. Real-time media may be transmitted and received more regularly than non-real-time data, which may be more likely to manifest as a burst or a spike of data packets at irregular intervals. Priority can be given based on available bandwidth to audio, video, and non-video web conference datashare, in that order. The non-video web conference datashare may include, for example, email, instant message, internet relay chat, on-line text, etc. In yet another implementation, probe packets are sent down the audio channel in addition to the data channel of the web-conferencing application if the audio codec is based on variable bitrate (VBR) rather than constant bitrate (CBR). The server can report the audio channel "delta ts" and "delta tr" to the client for codec bandwidth determination. The codec bandwidth value must be plugged into the formulas as discussed above for Total Send Bitrate (eq. 1) and Total Receive Bitrate (eq. 2).

The disclosed and other examples can be implemented as one or more computer program products, i.e., one or more modules of computer program instructions encoded on a computer readable medium for execution by, or to control the operation of data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored, in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus cars also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document describe many specifics, these should not be construed as limitations on the scope of an invention that is claimed or of what is claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features is described above as acting in certain combinations and even initially claimed as such, one or more features from a claimed combination can in some cases be excised from the combination, and the claimed combination is directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
   transmitting, by a computing device and at a first transmit time point, a first probe packet over a network connection to a conferencing server immediately before transmitting a data packet over the network connection to the conferencing server, the first probe packet arriving at the conferencing server at a first receive time point;
   transmitting, by the computing device and at a second transmit time point, a second probe packet over the network connection to the conferencing server immediately after transmitting the data packet over the network connection to the conferencing server, the second probe packet arriving at the conferencing server at a second receive time point, the first and second probe packets being smaller than the data packet;
   receiving, by the computing device, information encoding a first difference between the first and second transmit time points and a second difference between the first and second receive time points;

modifying, by the computing device and based on the first and second differences, a data transmission associated with data packets to be transmitted thereafter by the computing device over the network connection to the conferencing server; and reducing the data transmission of the data packets to be transmitted thereafter by the computing device over the network connection to the conferencing server, if the first difference is determined to be smaller than the second difference.

2. The method of claim 1, wherein the data transmission comprises one of: a packet size, a number of data packets transferred per unit of time, an amount of data transferred, or combinations thereof.

3. The method of claim 1, further comprising:
receiving, at the computing device and at a first server probe receive time, a first server probe packet transmitted by the conferencing server immediately before a server data packet is transmitted by the conferencing server to the computing device, the first server probe packet transmitted at a first server probe transmit time;
receiving, at the computing device and at a second server probe receive time, a second server probe packet transmitted by the conferencing server immediately after the server data packet is transmitted by the conferencing server to the computing device, the second server probe packet transmitted at a second server probe transmit time;
computing, by the computing device, a third difference between the first and second server probe transmit time points and a fourth difference between the first and second server probe receive time points; and
transmitting, by the computing device and to the conferencing server, information encoding the third and fourth differences.

4. The method of claim 1, wherein the modifying further includes:
increasing the data transmission of the data packets to be transmitted thereafter by the computing device over the network connection to the conferencing server, if the first difference is determined to be no smaller than the second difference.

5. The method of claim 1, further comprising:
establishing a first stream of data packets for a first component of the web-conferencing application; and
establishing a second stream of data packets for a second component of the web-conferencing application,
wherein the first stream of data packets have an associated packet size that is substantially larger than a packet size associated with the second stream of data packets,
wherein the second stream of data packets are transmitted substantially more regularly than the first stream of data packets, and
wherein the second stream of data packets correspond to real-time media.

6. The method of claim 5, wherein the first and second probe packets are transmitted along with the first stream of data packets.

7. The method of claim 5, wherein the network connection is through one of: a DSL modem or a cable modem.

8. A system comprising:
one or more processors; and
one or more storage devices configured to store instructions that are operable, when executed by the one or more processors, to cause the one or more processors to perform operations comprising:
transmitting, at a first transmit time point, a first probe packet over a network connection to a conferencing server immediately before transmitting a data packet over the network connection to the conferencing server, the first probe packet arriving at the conferencing server at a first receive time point;
transmitting, at a second transmit time point, a second probe packet over the network connection to the conferencing server immediately after transmitting the data packet over the network connection to the conferencing server, the second probe packet arriving at the conferencing server at a second receive time point, the first and second probe packets being smaller than the data packet;
receiving information encoding a first difference between the first and second transmit time points and a second difference between the first and second receive time points;
modifying, based on the first and second differences, a data transmission associated with data packets to be transmitted thereafter and over the network connection to the conferencing server; and
reducing data transmission of the data packets to be transmitted thereafter and over the network connection to the conferencing server, in response to the first difference being smaller than the second difference.

9. The system of claim 8, wherein the data transmission comprises one of: a packet size, a number of data packets transferred per unit of time, an amount of data transferred, or combinations thereof.

10. The system of claim 8, wherein the operations further comprise:
establishing a first stream of data packets for a first component of the web-conferencing application; and
establishing a second stream of data packets for a second component of the web-conferencing application,
wherein the first stream of data packets have an associated packet size that is substantially larger than a packet size associated with the second stream of data packets,
wherein the second stream of data packets are transmitted substantially more regularly than the first stream of data packets, and
wherein the second stream of data packets correspond to real-time media.

11. The system of claim 10, wherein the first and second probe packets are transmitted along with the first stream of data packets.

12. The system of claim 10, wherein the network connection is through one of: a DSL modem or a cable modem.

13. A non-transitory machine-readable medium including instructions executable by a processor, the instructions operable to cause the processor to perform functions including:
transmitting, at a first transmit time point, a first probe packet over a network connection to a conferencing server immediately before transmitting a data packet over the network connection to the conferencing server, the first probe packet arriving at the conferencing server at a first receive time point;
transmitting, at a second transmit time point, a second probe packet over the network connection to the conferencing server immediately after transmitting the data packet over the network connection to the conferencing server, the second probe packet arriving at the conferencing server at a second receive time point, the first and second probe packets being smaller than the data packet;

receiving information encoding a first difference between the first and second transmit time points and a second difference between the first and second receive time points;

modifying, based on the first and second differences, a data transmission associated with data packets to be transmitted thereafter and over the network connection to the conferencing server; and reducing data transmission of the data packets to be transmitted thereafter and over the network connection to the conferencing server, in response to the first difference being smaller than the second difference.

14. The non-transitory machine readable medium of claim 13, wherein the data transmission comprises one of: a packet size, a number of data packets transferred per unit of time, an amount of data transferred, or combinations thereof.

15. The non-transitory machine readable medium of claim 13, wherein the functions further include:

establishing a first stream of data packets for a first component of the web-conferencing application; and establishing a second stream of data packets for a second component of the web-conferencing application, wherein the first stream of data packets have an associated packet size that is substantially larger than a packet size associated with the second stream of data packets, wherein the second stream of data packets are transmitted substantially more regularly than the first stream of data packets, and wherein the second stream of data packets correspond to real-time media.

16. The non-transitory machine readable medium of claim 15, wherein the first and second probe packets are transmitted along with the first stream of data packets.

17. The non-transitory machine readable medium of claim 15, wherein the network connection is through one of: a DSL modem or a cable modem.

* * * * *

UNITED STATES PATENT AND TRADEMARK OFFICE
CERTIFICATE OF CORRECTION

PATENT NO. : 9,667,686 B2  
APPLICATION NO. : 14/576855  
DATED : May 30, 2017  
INVENTOR(S) : Michael A. Ramalho et al.

Page 1 of 2

It is certified that error appears in the above-identified patent and that said Letters Patent is hereby corrected as shown below:

In the Specification

In Column 2, Line 11, please amend as shown:
after the datashare packet. The probe packets each have a In Column 2, Line 54, please amend as shown:
(e.g., for end users to download files). The bottleneck In Column 3, Line 50, please amend as shown:
screen updates. The bursts of web conference datashare In Column 3, Line 65, please amend as shown:
Kbps upload for DSL and 4-6 Mbps download/1-1.5 Mbps In Column 4, Line 50, please amend as shown:
tion shared by more than one data streams, in block 202, a In Column 5, Line 51, please amend as shown:
Fragment (DF) bit turned on. For example, the probe packets In Column 5, Line 57, please amend as shown:
dummy packets with no payload data.

In Column 6, Line 22, please amend as shown:
difference and the receive time difference is in the payload In Column 7, Line 27, please amend as shown:
tions, the increase in data transmission can improve utiliza- Signed and Sealed this  
Twelfth Day of January, 2021

Andrei Iancu  
*Director of the United States Patent and Trademark Office*

CERTIFICATE OF CORRECTION (continued)
U.S. Pat. No. 9,667,686 B2

In Column 10, Line 32, please amend as shown:
be, for example, in the payload of a return packet, or a SIP In Column 12, Line 18, please amend as shown:
in FIG. 5, block 562 implements a "single report back to the In Column 13, Line 67, please amend as shown:
apparatus can also be implemented as, special purpose logic